United States Patent [19]  
Matsui et al.

[11] Patent Number: 4,985,809
[45] Date of Patent: Jan. 15, 1991

[54] SURFACE LIGHT SOURCE PANEL

[75] Inventors: Hirokazu Matsui; Shinzo Murase, both of Otsu, Japan

[73] Assignees: Matsushita Electric Industrial Co., Ltd., Osaka; Maytaku System, Shiga, both of Japan

[21] Appl. No.: 396,625

[22] Filed: Aug. 22, 1989

[30] Foreign Application Priority Data

Aug. 23, 1988 [JP] Japan .................................. 63-208670

[51] Int. Cl.$^5$ ............................................. F21V 7/04
[52] U.S. Cl. ................................................. 362/31
[58] Field of Search ................................... 362/31, 26

[56] References Cited

U.S. PATENT DOCUMENTS

| 2,347,665 | 5/1944 | Christensen et al. | 362/31 |
| 3,132,810 | 5/1964 | Ostensen | 362/31 |
| 4,373,282 | 2/1983 | Wragg. | |
| 4,729,067 | 3/1988 | Ohe | 362/31 X |
| 4,811,507 | 3/1989 | Blanchet | 362/31 X |
| 4,860,171 | 8/1989 | Kojima | 362/31 |

FOREIGN PATENT DOCUMENTS

| 242308 | 10/1987 | European Pat. Off. | |
| 31104 | 8/1926 | France | 362/31 |
| 58-38186 | 3/1983 | Japan | 362/31 |
| 2196100A | 4/1988 | United Kingdom | |

Primary Examiner—Allen M. Ostrager
Attorney, Agent, or Firm—Wenderoth, Lind & Ponack

[57] ABSTRACT

The present invention provides a surface light source panel having superior brightness and uniformity of light. According to the present invention, diffused reflection sections are formed onto a transparent resin substrate by the printing of ink. Since the density of the diffused reflection sections and the area ratio thereof with respect to the transparent resin substrate, and also the containing ratio of additives in the ink are specified, the surface light source panel displays superior brightness and uniformity of light even when the substrate is a single plate which has ben laminated in a conventional panel. Moreover, although the surface light source panel of the present invention is provided with a light source at one end thereof, since the portion of the largest area ratio of the diffused reflection sections is arranged at a position deflected to the side of a reflecting part at the other end of the panel, the brightness and uniformity of the light can be more secured.

11 Claims, 5 Drawing Sheets

SURFACE LIGHT SOURCE PANEL

BACKGROUND OF THE INVENTION

The present invention generally relates to a surface light source panel adapted to guide and illuminate an incident light from a light source provided at an end of the panel for use in various kinds of illuminating devices such as an illumination signboard, display panel or backlight of liquid crystal display, etc., and more particularly to a surface light source panel representing improved brightness and uniformity of light.

Generally, in the surface light source panel of the type referred to above, it is relatively bright in the vicinity of the light source at an end portion of the panel, but, the incident light is difficult to be guided well to a position of the panel far from the light source. Therefore, it has been regarded extremely difficult to realize a surface light source panel having uniformity in brightness. Many ideas intended for improvement have been proposed, though.

For example, Japanese Patent Laid-open Application Nos. 60-87387, 60-181780, 62-902, etc. have been proposed to laminate transparent resin substrates to constitute a surface light source panel, each of which substrate is provided with a means for generating a diffused or irregular reflection so that the light guiding efficiency of the panel can be secured. Japanese Patent Laid-open Application No. 57-128383 has disclosed a surface light source panel in which sections for generating diffused or irregular reflection are formed on a transparent resin substrate by, e.g., the coating of the paint of white family in such a manner that the area ratio of the sections becomes sequentially larger from a position of the light source at an end portion of the substrate, whereby the light guiding efficiency of the panel is improved. Furthermore, it has been proposed in Japanese Patent Laid-open Application No. 60-205576 to improve the light guiding efficiency of a surface light source panel so that a totally uniform section in which diffused reflection is produced is provided in a transparent resin substrate by a coating of a white ink containing glass beads.

The light guiding efficiency of the surface light source panel may possibly be improved to some extent by these proposals as mentioned above. However, any of the proposed surface light source panels is hardly said to be practical in terms of the brightness and uniformity of light. Especially, the difference is conspicuous when comparing a signboard using any one of the proposed surface light source panels with an illumination signboard which has many fluorescent lamps, etc. provided at the back thereof. The signboard using the proposed surface light source panel tends to be illuminated only in the vicinity of the light source, since the light guiding efficiency of the panel is not sufficient. The maximum brightness is generally 300 nit (cd/m$^2$) or so in the case of the illumination by a light source at one end portion of the panel. Consequently, the signboard using the conventionally-proposed surface light source panel has a level of brightness that gives a considerably dark impression as compared with the backlighting illumination signboard. The brightness of the surface light source panel has been thus recognized to be such as referred to above, at the most.

Although the brightness and the uniformity of light by the surface light source panel are required depending on the useful purpose and the like, the improvement should be urgent so that the surface light source panel is able to be widely used in various ways.

SUMMARY OF THE INVENTION

Accordingly, the present invention has been developed with a view to substantially eliminating the above-described disadvantages inherent in the prior art surface light source panels, and has for its essential object to provide an improved surface light source panel which is really practically utilizable, with superior brightness and uniformity of light.

In accomplishing the above-described object, the inventors of the present invention have come to realize, after making strenuous efforts for improvement, that it is most adequate to provide sections for generating diffused reflection in a surface light source panel to thereby secure the brightness of the panel, and at the same time they have found that it is considerably effective to construct the surface light source panel in the following manner so as to secure well the light conducting efficiency of the panel, which results in high brightness and uniformity of light.

More specifically, according to the present invention, the sections for generating diffused reflection are maintained to keep the light permeability to pass the light therethrough in a dimming manner, with the generation of a slight diffused reflection. In this case, the density of the sections should be in the range not less than 900 dots/inch$^2$ and not more than 4225 dots/inch$^2$, and moreover the area ratio should not be changed stepwisely. In other words, the area ratio of the sections with respect to a transparent resin substrate should be 20-35% at the lowermost side of the panel, and 45-65% at the uppermost side, and more preferably, 25-30% at the lowermost side and 50-60% at the uppermost side. If the section for generating diffused reflection is formed by printing, the ink used should contain both a first additive such as a white-family coloring agent, etc. and a second additive such as a fluorescent substance, a light accumulating substance or the like. Moreover, the containing ratio of the additives in the ink should be not less than 13 wt % and not more than 30 wt % and more preferably, not less than 15 wt % and not more than 27 wt % by solid. That is, an the concentration of which is reduced should be employed. Furthermore, glass beads are added to the ink when printing. In correlation to the thickness of the transparent resin substrate, the density of the sections is not less than 2500 dots/inch$^2$ and not more than 4225 dots/inch$^2$ when the thickness is less than 8 mm, while it is not less than 900 dots/inch$^2$ and not more than 2500 dots/inch$^2$ when the thickness of the substrate is over 8 mm. Meanwhile, the number of the substrates laminated to constitute the panel should be reduced as much as possible, so that a single plate is used for each one illuminating surface. Particularly, if the surface light source panel has a light source provided at one lateral end thereof and a reflecting part at the other lateral end thereof, a portion having the largest area ratio of the diffused reflection sections is placed at a position deflected to the side of the reflecting part including the central position between the light source and the reflecting part, and at the same time, it is so arranged that the area ratio of the diffused reflection sections is gradually reduced not stepwisely in a symmetrical relation to opposite directions from the deflected position.

In the surface light source panel of the present invention having the above-described construction, each diffused reflection section lets the incident light pass therethrough in a dimming manner, with repeating the slight diffused reflection, upon receipt of the incident light from the one or more light sources at an end portion of the panel. Therefore, the incident light can be guided far in the panel not only because of the predetermined density of the sections in the range not less than 900 dots/inch$^2$ and not more than 4225 dots/inch$^2$, but because of the increase of the area ratio inversely proportional to the distance from the light source, so that the surface illumination with high brightness and superb uniformity is realized all over the illuminating surface.

In another aspect of the present invention, the range of the change in the area ratio of the diffused reflection sections is so determined as referred to above, and accordingly, the highly bright and uniform surface illumination can be positively accomplished.

In a further aspect of the present invention, the diffused reflection section is formed by printing of the ink the concentration of which is reduced onto a transparent resin substrate, which is effective for improvement of the light permeability and light dispersion, resulting in enhancement of the brightness and uniformity of light as a whole.

According to a still further aspect of the present invention, the density of the diffused reflection sections can be set to be optimum in accordance with the thickness of the transparent resin substrate. Therefore, by reducing the thickness or laminated number of the substrates as much as possible, loss of the incident light following the lamination can be prevented, so that the light conducting efficiency of the panel can be secured, resulting in high brightness and uniformity of the light.

In a still further aspect of the present invention, since the portion having the largest area ratio of the diffused reflection sections is positioned in the aforementioned deflected position when the light source is one, the incident light from the light source is passed through the panel by the diffused reflection sections the area ratio of which is increased initially not gradually, causing the panel to glitter. On the other hand, at the side of the reflecting part from the portion of the largest area ratio, the complex or mixed light of the incident light advancing in the panel while being reduced in amount and the reflecting light reflected by the reflecting part is controlled by the diffused reflection sections the area ratio of which in this area is reduced. Thus, the brightness and uniformity of the light can be secured.

It is to be noted here that the portion of the largest area ratio does not reach the end of the panel where the reflecting part is provided even if it is deflected to the side of the reflecting part. Therefore, according to the present invention, the relative distance between the light source and the portion of the largest area ratio is shortened, and the position where the surface light source panel represents the maximum light amount becomes close to the side of the light source. The brightness is accordingly increased so much as a whole.

BRIEF DESCRIPTION OF THE DRAWINGS

The above and other objects and features of the present invention will become apparent from the following description taken in conjunction with preferred embodiments thereof with reference to the accompanying drawings, in which.

DETAILED DESCRIPTION OF PREFERRED EMBODIMENTS

Figure 1:
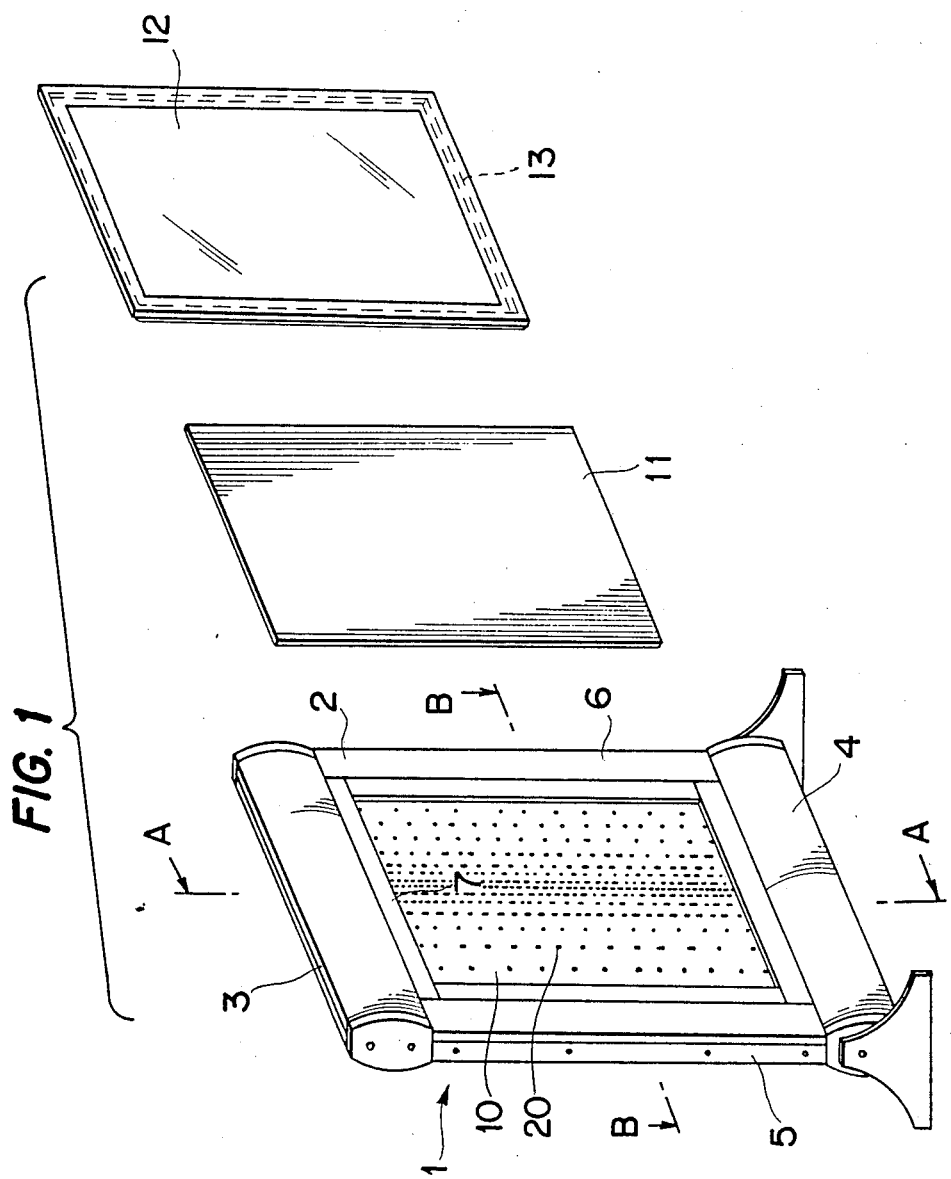
FIG. 1 is an exploded perspective view of a surface light source panel according to a first embodiment of the present invention.

Before the description of the present invention proceeds, it is to be noted here that like parts are designated by like reference numerals throughout the accompanying drawings.

Figure 2:
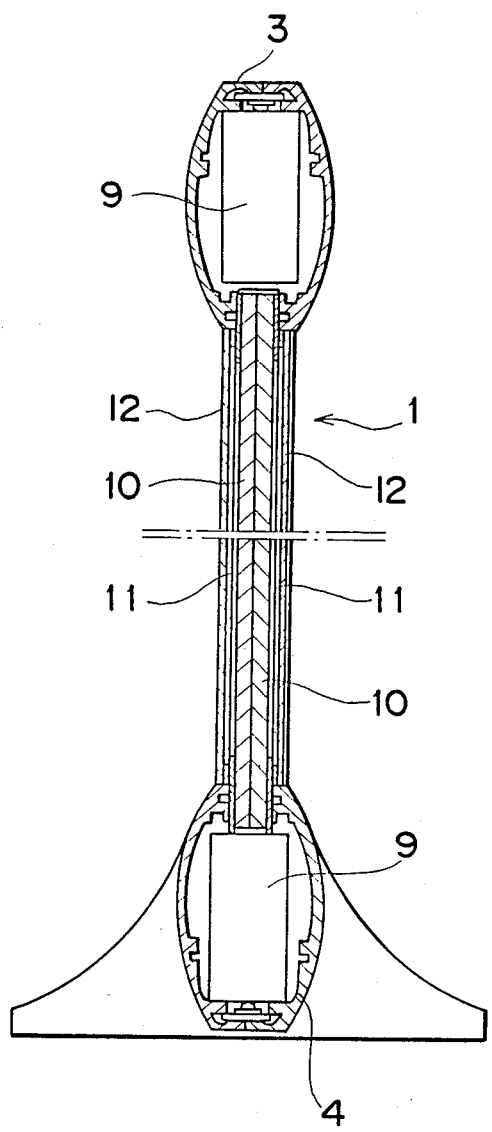
FIG. 2 is a longitudinal cross sectional view taken along a line A—A of FIG. 1.
Figure 3:
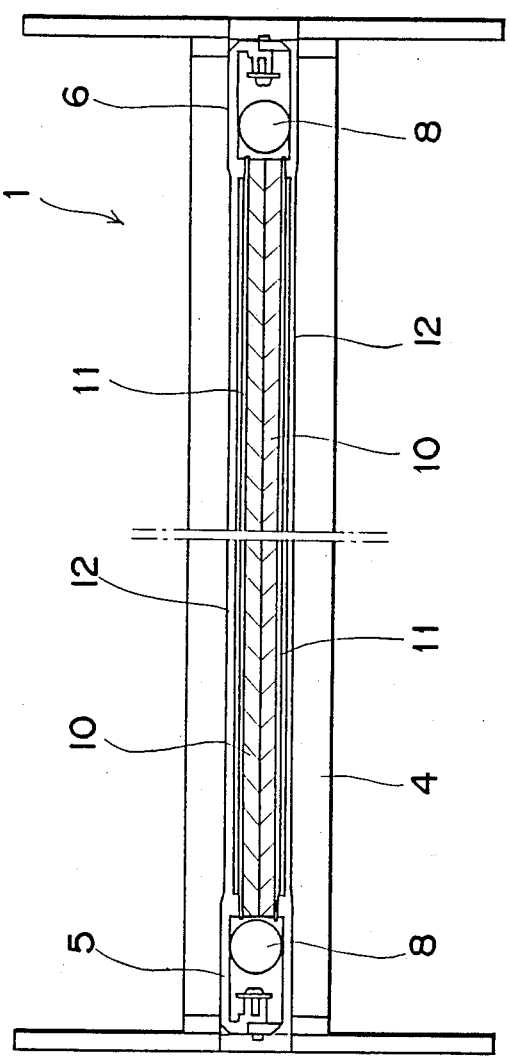
FIG. 3 is a lateral cross sectional view taken along a line B—B of FIG. 1.

With reference to FIGS. 1-3, an example of an illumination signboard of a positive image film using a surface light source panel according to the present invention will be described. The description is accompanied with results of the improvement achieved by the present invention in comparison of embodiments 1 through 7 with comparative examples 1 and 2.

In FIGS. 1-3, there is shown an example that a surface light source panel is applied in an illumination signboard of a double-face illumination type as a desktop illuminating device, for example, a counter.

An illumination signboard 1 has illuminating surfaces each of the size generally A4 provided at the front and rear surfaces thereof. Two surface light source panels 10 are employed. In front of each surface light source panel 10 confronts a positive image film 11 in face-to-face relation. Moreover, a transparent panel 12, 2 mm thick, is detachably laminated respectively on the front and rear surfaces of the positive image film 11. Accordingly, the positive image film 11 can be illuminated at the back surface thereof by the surface light source panel 10.

Lateral frame members 3 and 4 at the upper and lower ends of the illumination signboard 1 (longitudinal frame members at the left and right ends when the signboard is turned laterally) which are made by synthetic resin molding are formed in an expanded configuration respectively so as to accommodate a stabilizer 9 of a fluorescent lamp therein. The lateral frame members 3 and 4 together with left and right longitudinal frame members 5 and 6 constitute a frame 2 of the signboard 1. Each of the longitudinal frame members 5 and 6 has a thickness not more than 20 mm.

A single plate of the surface light source panel 10 is fitted in the frame 2 for each one illuminating surface, and therefore two single plates of the surface light source panel in total are securedly fitted in the frame 2 for the double-face illumination. Milky color resin films (not shown) are sandwiched between the panels and between the panels and the illuminating surfaces. In this case, the surface light source panel 10 is provided with diffused reflection sections 20 having, for example, a density of 3600 dots/inch$^2$ and an area ratio of 30–50% which is changed not gradually. The diffused reflection sections are so formed as not to confront the positive image film 11, but at the back of the positive image film 11.

Furthermore, a fluorescent lamp 8 of 8 w is accommodated in each of the longitudinal frame members 5 and 6 to thereby serve as a light source at a left or right end portion of the panel 10.

Reference numerals 7 and 13 represent an inside frame of iron protruding to the inner side of each illuminating surface, and a magnet body provided corresponding to the inside iron frame and in the transparent panel 12, respectively. By these inside frame 7 and magnet body 13, the positive image film 11 can be easily exchanged.

EMBODIMENT 1

(A) On one surface of an acrylic resin substrate having 3 mm thickness, diffused reflection sections are formed by screen printing with the employment of a halftone screen pattern of L'etra Japan, Co., Ltd., whereby a surface light source panel of A4 size is formed. At this time, glass beads (2,500 meshes) are added to a white ink of reduced concentration with containing additives, that is, a first diffused reflection additive of white coloring agent and a second diffused reflection additive of a fluorescent coloring agent by the ratio 6:4, by 23 wt % by solid. The diffused reflection sections in the density of 1806.25 dots/inch$^2$ have the area ratio of 25% at the side of the light source and 60% at the other side, and accordingly the diffused reflection sections become sequentially highly dense, not stepwisely, from the light source to the other portions of the panel. Four surface light source panels are laminated for each one illuminating surface, with a light source by a 6 w fluorescent lamp being used for one-face illumination.

The result is as indicated in Table 1, embodiment 1-A, in that the brightness of 400 nit is obtained, with favorable uniformity. Although dots are slightly observed, it is excellently bright as a whole.

(B) The same surface light source panel as in embodiment 1-(A) above is obtained, except that the area ratio of the diffused reflection sections is 20% at the opposite upper and lower ends of the panel and 50% at the central part there are four laminates in total, for one-face illumination and double-face illumination by two light sources, namely, two 8 w fluorescent lamps at the upper and lower ends of the panel.

As a result, a brightness of 1,100 nit in the one-face illumination, and that of 740 nit in the doubleface illumination, by two 8 w fluorescent lamps is obtained. With regard to the other points, results are the same.

EMBODIMENT 2

(A) A white ink of reduced concentration is used and combined with the additives by 19 wt % to print diffused reflection sections in the density of 2500 dots/inch$^2$. Thus, the same illuminating device as in the embodiment 1-(A), except for the above points, is constructed.

The uniformity of light is more improved, with a brightness of 450 nit.

(B) The area ratio of the diffused reflection sections is made the same, 20–50%, as in embodiment 1-(B).

A brightness of 1,330 nit is obtained in the one-face illumination by the two 8 w fluorescent lamps, while the brightness of 880 nit is obtained in the double-face illumination by the two 8 w fluorescent lamps. The other points are the same as in the embodiment 2-(A).

EMBODIMENT 3

(A) A white ink of reduced concentration, which is combined with additives 15 wt % by solid, is employed. The density of the diffused reflection sections is made 3,600 dots/inch$^2$. The same illuminating device as obtained in the embodiment 2-(A), except the above ratio of the additives and the density of the diffused reflection sections, is constructed.

As a result, a brightness of 520 nit is obtained with remarkable uniformity. Moreover, the halftone is hardly noticed.

(B) Similar to the embodiment 1-(B), the area ratio is made 20–50%.

With the one-face illumination, a brightness of 1,540 nit is obtained, whereas with the double-face illumination, a brightness of 1,060 nit is obtained. The other points are the same as in the above embodiment 3-(A).

EMBODIMENT 4

(A) The same illuminating device as in the embodiment 2-(A), except that a diffused reflection sections have the density of 3,600 dots/inch$^2$, is used.

Remarkably splendid result obtained, with a brightness of 600 nit and superior uniformity.

(B) The area ratio is made the same 20–50% as in the embodiment 1-(B).

A brightness of 1,700 nit with the one-face illumination, and 1,150 nit with the double-face illumination is obtained, with the other points being the same as in the embodiment 4-(A).

EMBODIMENT 5

(A) The thickness of the acrylic resin substrate is 4 mm, and three substrates are laminated. The ratio of the additives in the less-concentrated white ink is 21 wt %. The area ratio of the diffused reflection sections is 35–60%. Outside the above points, the same illuminating device as in the embodiment 4-(A) is used.

A brightness of 660 nit, with superb uniformity, is gained.

(B) The area ratio is made 30–50% by two light sources for one-face illumination and double-face illumination.

In the case of one-face illumination, the brightness results in 1,750 nit. In the case of the doubleface illumination, the brightness is not measured, but exceeds the level of the embodiment 4-(B). The other points are the same as in the embodiment 5-(A).

EMBODIMENT 6

(A) Two acrylic resin substrates, each 6 mm thick, are laminated. The density of the diffused reflection sections is 2,500 dots/inch$^2$, and the area ratio thereof is 35–60%. The same illuminating device as in the embodiment 1-(A), except for the above-described points, is constructed.

Thus, a brightness of 700 nit is obtained with great uniformity.

(B) Similar to the embodiment 1-(B), the area ratio of the diffused reflection sections is made 30–50%.

The result is that the brightness of 1,850 nit by one-face illumination and 1,280 nit by double-face illumination is obtained. The other points are identical to those in the embodiment 6-(A).

EMBODIMENT 7

(A) One acrylic resin substrate of 12 mm thickness is employed. A white ink of reduced concentration contains additives by 27 wt % in solid, namely, a first additive of a white coloring agent and a second additive of a fluorescent coloring agent by the ratio 5:5. The diffused reflection sections are formed in the density of 900 dots/inch$^2$ and the area ratio of 40–60%. The other points are maintained the same as in the embodiment 1-(A) to constitute the illuminating device.

As a result, a brightness of 750 nit with great uniformity is obtained.

(B) The area ratio of the diffused reflection sections is made 30–50%, similar to the embodiment 1-(B).

Thus, a brightness of 2,000 nit by the two light sources in one-face illumination is obtained. Although the brightness by the double-face illumination is not measured, it exceeds the level of the embodiment 6-(B). The other points are the same as in the embodiment 7-(A).

COMPARATIVE EXAMPLE 1

(A) A white ink containing additives by 37 wt %, but not containing a fluorescent substance is used to form the diffused reflection sections in the density of 400 dots/inch$^2$ and with an area ratio of 10–30%. The other points are held the same as in the embodiment 1-(A).

As a result, the brightness remains 200 nit. The halftone is so much as to generate the light in a pattern of dots. The generated light lacks in uniformity.

(B) The area ratio is not changed, but maintained to be 10–30% as in the comparative example 1-(A). The one-face illumination and double-face illumination by two light sources are carried out similarly to the embodiment 1-(B).

The brightness of 550 nit and 400 nit by the one-face illumination and double-face illumination, respectively, is obtained, with the other points being identical to those in the comparative example 1-(A).

COMPARATIVE EXAMPLE 2

(A) Except that the additives are contained, by 33 wt %, in the ink and the diffused reflection sections are arranged to have the density of 756.25 dots/inch$^2$, an illuminating device identical to that of the comparative example 1-(A) is constructed.

The generated light shows a slight but insufficient tendency of the uniformity. The brightness is only 300 nit, which is not enough. Dots are clearly apparent.

(B) In the same manner as in the comparative example 1-(B), the illuminating device obtained in the comparative example 2-(B) is used for the one-face illumination and for the double-face illumination with two light sources.

In consequence, the brightness is 800 nit by the one-face illumination, and 550 nit by the double-face illumination.

TABLE 1

| | Thickness of substrate | Ratio of additives | Density (dots/inch$^2$) | Area ratio | Nos. of laminated plates | Uniformity |
|---|---|---|---|---|---|---|
| Embodiment | | | | | | |
| 1 A | 3 mm | 23 wt % | 1806.25 | 25–80% | 4 sheets | o |
| B | 3 mm | 23 wt % | 2500 | 20–50% | 4 sheets | o |
| 2 A | 3 mm | 19 wt % | 3600 | 25–60% | 4 sheets | o |
| B | 3 mm | 19 wt % | 3600 | 20–50% | 4 sheets | o |
| 3 A | 3 mm | 15 wt % | 3600 | 25–60% | 4 sheets | o |
| B | 3 mm | 15 wt % | 3600 | 20–50% | 4 sheets | o |
| 4 A | 3 mm | 19 wt % | 3600 | 25–60% | 4 sheets | o |
| B | 3 mm | 19 wt % | 3600 | 20–50% | 4 sheets | o |
| 5 A | 4 mm | 21 wt % | 3600 | 35–60% | 3 sheets | o |
| B | 4 mm | 21 wt % | 3600 | 30–50% | 3 sheets | o |
| 6 A | 6 mm | 23 wt % | 2500 | 35–60% | 2 sheets | o |
| B | 6 mm | 23 wt % | 2500 | 30–50% | 2 sheets | o |
| 7 A | 12 mm | 27 wt % | 900 | 40–60% | 1 sheet | o |
| B | 12 mm | 27 wt % | 900 | 30–50% | 1 sheet | o |
| Comparative example | | | | | | |
| 1 A | 3 mm | 37 wt % | 400 | 10–30% | 4 sheets | x |
| B | 3 mm | 37 wt % | 400 | 10–30% | 4 sheets | x |
| 2 A | 3 mm | 33 wt % | 756.25 | 10–30% | 4 sheets | Δ |
| B | 3 mm | 33 wt % | 756.25 | 10–30% | 4 sheets | Δ |

| | Brightness (nit) | | | | |
| | 6 w × 1 | 8 w × 2 | 8 w × 2 surfaces | Total valuation | Remarks |
|---|---|---|---|---|---|
| Embodiment | | | | | |
| 1 A | 400 | — | — | o | Dots are slightly observed |
| B | — | 1100 | 740 | o | of the diffused reflection |
| 2 A | 450 | — | — | o | sections. |
| B | — | 1330 | 880 | o | |
| 3 A | 520 | — | — | | Dots of the diffused |
| B | — | 1540 | 1060 | | reflection sections are |
| 4 A | 600 | — | — | | hardly observed. |
| B | — | 1700 | 1150 | | |
| 5 A | 660 | — | — | | |
| B | — | 1750 | not measured | | |
| 6 A | 700 | — | — | | |
| B | — | 1850 | 1280 | | |
| 7 A | 750 | — | — | | |
| B | — | 2000 | not measured | | |
| Comparative example | | | | | |
| 1 A | 200 | — | — | x | Dots are considerably |
| B | — | 550 | 400 | x | conspicuous. |
| 2 A | 300 | — | — | Δ | |
| B | — | 800 | 550 | Δ | |

A surface light source panel according to a second embodiment of the present invention will be described hereinafter with reference to FIGS. 4 and 5.

Figure 4:
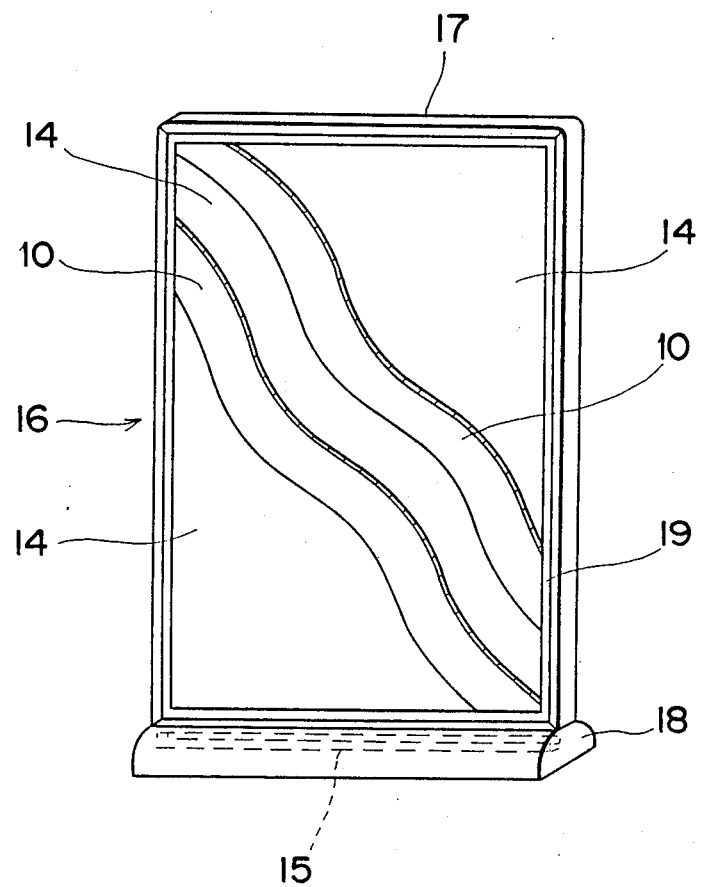
FIG. 4 is a perspective view of a surface light source panel according to a second embodiment of the present invention.

In FIG. 4, the surface light source panel 10 is employed in a standing (desktop) display device of generally A4 size for double-face illumination by one light source. In this case, therefore, two surface light source panels 10, each 6 mm thick, are so provided as to sandwich a milky color polyester film therebetween, and moreover the same milky color polyester film is laminated onto the front surface of each surface light source panel 10 by way of precaution. When a positive image film of A4 size (not shown) is securedly placed in the display device by a frame 19 which is made detachable by a rubber magnet, the display device can be used as an illumination signboard on the counter.

Reference numerals 17 and 18 in FIG. 4 respectively represent a display casing and a stand accommodating a light source 15 therein.

Figure 5:
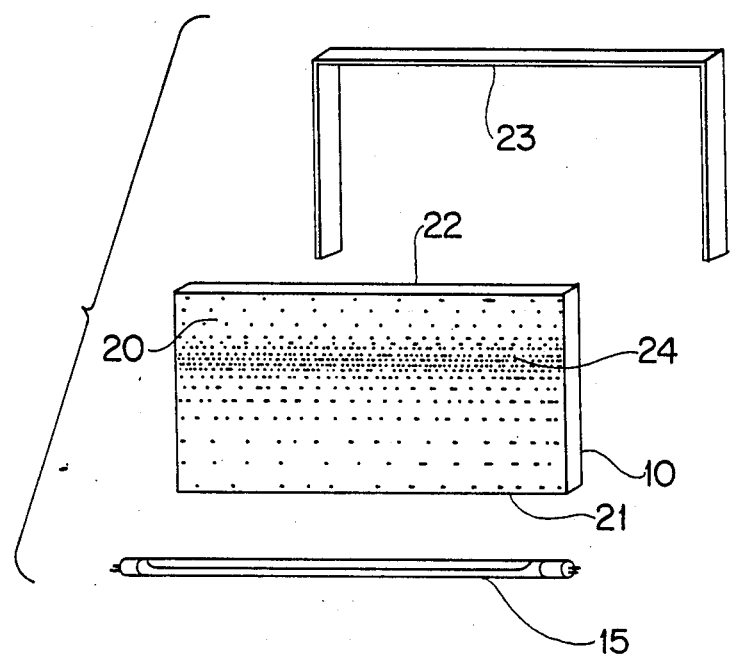

FIG. 5 shows the portion of the surface light source panel 10 in the embodiment of FIG. 4, and is so arranged that the area ratio occupied by the irregular reflection layer in the surface light source panel 10 is successively varied in a stepless or gradual manner from one side edge face 21 for the primary light source 15 so that the maximum area ratio portion 24 thereof is located in a position deviated towards the side of the end reflecting portion 23, from a central position between the primary light source 15 at the side of the one side edge face 21 and the end reflecting portion 23 of the other end side edge face 22.

Although it is preferable to arrange the deflected position at a position two-thirds of the one side in a longitudinal direction of the panel, it is varied depending on the light amount of the light source used, size of the surface light source panel, presence or absence of the distance between the reflecting part and the light source, or presence or absence of a curved portion, etc. Therefore, the deflected position is not always restricted to the above-mentioned position, but may be determined under concrete circumstances on condition that it is deflected to the side of the reflecting part at the other end than the light source, including the central position between the light source and the reflecting part. In general, a standard position is preferably within the range approximately 3/5-4/5 the side of the panel. The area ratio decreases gradually from the maximum area ratio portion 24 toward the end reflecting portion 23.

If the light source is a fluorescent lamp of cold cathode, although any type of the light source may be selected, one that is comprised of an aperture tube is most effective and desirable to obtain the brightness.

The reflecting part may be formed by using a tape, or directly applying a paint onto the surface of the substrate, or an independent reflecting plate such as a band plate stuck with an aluminum foil may be tightly placed at the proper position. It may also be possible that an aluminum foil is stuck to the surface of the substrate confronting the holder casing of the panel.

The area ratio of the diffused reflection sections is enough to be determined by eye-measurement, and it is not essential for the diffused reflection sections to have strict symmetry of the area ratio. The minimum area ratio is suitable to be around 20%. Moreover, it is preferable so as to obtain a good result that the area ratio at the reflecting part is set to be approximately not less than 20% and not more than 40%.

In addition, the diffused reflection sections may be formed by any means, for example, a screen pattern other than printing, into a hairline or a haircloth shape comprised of gathered fine dots. In this case, the screen pattern should have the density not less than 900 dots/inch$^2$ and not more than 4225 dots/inch$^2$. Besides, the concrete structure of the surface light source panel may be determined with reference to the embodiments described earlier. The surface light source panel may be flat or curved. Furthermore, the surface light source panel according to the present invention can be utilized singly or by being incorporated in other various kinds of devices to be an indoor or outdoor illuminator or signboard, and accordingly it is neither necessary to provide a light source confronting the surface light source panel, nor to mount a transformer. The surface light source panel enables realization of a considerably thin illuminating device. For example, if the surface light source panel is incorporated in an electronic equipment, the equipment is rendered thin and compact. By installing a liquid crystal display panel in place of the positive image film in the surface light source panel, a thin liquid crystal display device is obtained.

As has been fully described hereinabove, the surface light source panel having the above-described construction show following effects.

More specifically, since the surface light source panel is provided with diffused reflection sections which have the area ratio sequentially increased not stepwisely from the position of the light source at an end of the transparent resin substrate, and each diffused reflection section keeps its light permeability, with the density not less than 900 dots/inch$^2$ and not more than 4225 dots/inch$^2$, that is, the diffused reflection sections function in a manner rather contrary to the conventional technical knowledge, the incident light from the light source can be guided far all over the panel with high brightness and uniformity. Therefore, the surface light source panel is suitable for practical use.

In the present invention, since the area ratio of the diffused reflection sections with respect to the transparent resin substrate is changed in the range 20-35% and 45-65% at the lowermost side and at the uppermost side of the substrate, respectively, the brightness and uniformity are much improved.

Meanwhile, when the diffused reflection sections are formed by the printing of ink, the less-concentrated ink containing additives not less than 13 wt % and not more than 30 wt % by solid is used. Moreover, the above-mentioned additives are comprised of the first additive of white coloring agent, etc. and the second additive of fluorescent and light-accumulating substance, etc. As a result, the favorable result is obtained in the brightness and uniformity. Further, because the ink is added with glass beads when printing the diffused reflection sections by the ink, the brightness and uniformity are improved.

If the transparent resin substrate is less than 8 mm, the density of the diffused reflection sections is made relatively high, namely, not less than 2500 dots/inch$^2$ and not more than 4225 dots/inch$^2$. On the other hand, if the substrate is over 8 mm, the diffused reflection sections are dense relatively in a medium level, not less than 900 dots/inch$^2$ and not more than 2500 dots/inch$^2$. Accordingly, the surface light source panel can display high brightness and uniformity in accordance with the thickness of the substrate.

Since one transparent resin substrate is employed for every one illuminating surface to reduce the number of laminated substrates, the loss of the light can be prevented to thereby secure good light guiding efficiency of the panel.

Moreover, in the case where the light source is provided at one end of the panel and the reflecting part is formed at the other end of the panel, it becomes unnecessary to provide a light source not only at the back of the panel, but at the other side thereof, with no transformer necessitated therefore. Therefore, by incorporating or mounting the light source in a stand or coupling part, etc. at the one end of the panel, a thin and compact illuminating device can be realized.

Since the portion of the largest area ratio in the diffused reflection sections is arranged at the deflected position to the side of the reflecting part including the central position between the light source and the reflecting part, and at the same time, the area ratio of the diffused reflection sections is symmetrically and not stepwisely changed in opposite directions from the deflected position, remarkably bright and uniform illumination can be achieved. In consequence, the surface light source panel is practically applied to various kinds of illuminations including a backlighting.

Although the present invention has been fully described hereinabove by way of example with reference to the accompanying drawings, various changes and modifications would be apparent to those skilled in the art. Therefore, unless otherwise such changes and modifications depart from the scope of the present invention, they should be construed as included therein.

What is claimed is:

1. A surface light panel, comprising:
   a transparent substrate,
   a light source at one end of said transparent substrate;
   a reflecting means at the other end of said transparent substrate; and
   a plurality of diffused reflection sections on said transparent substrate;
   wherein said diffused reflection sections are distributed on said transparent substrate such that the ratio of said diffused reflection sections per unit area of said transparent substrate sequentially increases the further said diffused reflection sections are from said light source up to a maximum area ratio position and decreases the closer said diffused reflection sections are to said reflecting means from said maximum area ratio position.

2. The surface light source panel as set forth in claim 1, wherein:
   said maximum area ratio position is located more than halfway from said light source toward said reflecting means on said transparent substrate.

3. The surface light source panel as set forth in claim 1, wherein:
   said ratio of said diffused reflection sections decreases symmetrically from said maximum area ratio position toward said light source and said reflecting means.

4. The surface light panel as set forth in claim 1, wherein said ratio of said diffused reflection sections changes gradually on said transparent substrate.

5. The surface light source panel as set forth in claim 1, wherein said diffused reflection sections are composed such that they produce a slight diffuse reflection and maintain a light permeability sufficient to pass light therethrough with a dimming effect.

6. The surface light source panel as set forth in claim 1, wherein said area ratio changes in a range of 20–40% and 50–60% at the lowermost and uppermost sides of said transparent substrate, respectively.

7. The surface light source panel as set forth in claim 1, wherein said diffused reflection sections on said transparent substrate comprise ink printed on said transparent substrate of a reduced concentration containing additives of not less than 15 wt % and not more than 27 wt % of solids, said additives comprising a first additive of a white coloring agent and a second additive of a fluorescent and light-accumulating substance.

8. The surface light source panel as set forth in claim 7, wherein:
   said ink of reduced concentration further has glass beads therein, said glass beads being added to said ink before said ink is printed on said transparent substrate.

9. The surface light source panel as set forth in claim 1, wherein:
   said transparent substrate has a thickness of not less than 6 mm; and
   said diffused reflection sections have a density on said transparent substrate of not less than 900 dots/inch$^2$ and not more than 2500 dots/inch$^2$.

10. The surface light source panel as set forth in claim 1, wherein:
    said transparent substrate has a thickness of not less than 8 mm; and
    said diffused reflection sections have a density on said transparent substrate of not less than 2500 dots/inch$^2$ and not more than 4225 dots/inch$^2$.

11. The surface light source panel as set forth in claim 1, wherein said transparent substrate comprises a single plate for each surface to be illuminated.

* * * * *